(12) United States Patent
Yoshida et al.

(10) Patent No.: US 7,752,496 B2
(45) Date of Patent: Jul. 6, 2010

(54) METHOD, APPARATUS, AND COMPUTER PRODUCT FOR MANAGING LOG DATA

(75) Inventors: Masahiro Yoshida, Kawasaki (JP); Takeshi Obata, Kawasaki (JP); Taichi Ohno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 568 days.

(21) Appl. No.: 11/188,690

(22) Filed: Jul. 25, 2005

(65) Prior Publication Data

US 2006/0218444 A1 Sep. 28, 2006

(30) Foreign Application Priority Data

Mar. 28, 2005 (JP) .............................. 2005-092378

(51) Int. Cl.
*G06F 11/00* (2006.01)
(52) U.S. Cl. ............................................ 714/20; 714/7
(58) Field of Classification Search .................. 714/20, 714/7
See application file for complete search history.

(56) References Cited

U.S. PATENT DOCUMENTS

| | | | | |
|---|---|---|---|---|
| 5,155,731 A * | 10/1992 | Yamaguchi | .................. | 714/45 |
| 5,675,727 A * | 10/1997 | Watanabe | .................... | 714/20 |
| 5,706,470 A * | 1/1998 | Okada | ........................ | 711/161 |
| 6,553,509 B1 * | 4/2003 | Hanson et al. | ................. | 714/5 |
| 6,584,586 B1 * | 6/2003 | McCoy | ......................... | 714/45 |
| 6,898,733 B2 * | 5/2005 | Parks et al. | .................... | 714/15 |
| 6,989,907 B1 * | 1/2006 | Jeyachandran et al. | ..... | 358/1.15 |
| 6,996,580 B2 * | 2/2006 | Bae et al. | ..................... | 707/200 |
| 7,143,317 B2 * | 11/2006 | Lyle et al. | ..................... | 714/45 |
| 7,158,998 B2 * | 1/2007 | Bhuyan | ...................... | 707/201 |
| 7,165,187 B2 * | 1/2007 | Ji et al. | ......................... | 714/5 |
| 7,185,228 B2 * | 2/2007 | Achiwa | ....................... | 714/20 |
| 7,299,379 B2 * | 11/2007 | Royer et al. | .................. | 714/20 |
| 7,318,171 B2 * | 1/2008 | Rothman et al. | .............. | 714/25 |
| 2002/0152429 A1 * | 10/2002 | Bergsten et al. | ............... | 714/43 |
| 2003/0018619 A1 * | 1/2003 | Bae et al. | ....................... | 707/3 |
| 2004/0078724 A1 * | 4/2004 | Keller et al. | .................. | 714/48 |
| 2004/0181708 A1 * | 9/2004 | Rothman et al. | .............. | 714/10 |

FOREIGN PATENT DOCUMENTS

| | | |
|---|---|---|
| JP | 02-144736 | 6/1990 |
| JP | 02-226452 | 9/1990 |
| JP | 3-105434 | 5/1991 |
| JP | 05-257734 | 10/1993 |
| JP | 2001-175509 | 6/2001 |
| JP | 2001-211231 | 8/2001 |

* cited by examiner

*Primary Examiner*—Robert Beausoliel
*Assistant Examiner*—Joshua P Lottich
(74) *Attorney, Agent, or Firm*—Greer, Burns & Crain, Ltd.

(57) ABSTRACT

A log management module 10 acquires log data from a computer, temporarily stores the log data in a buffer, and writes the stored log data into a disk device 30a. When the log management module 10 detects a failure in the computer, the log management module 10 stops writing log data in the disk device 30a, and writes log data acquired after the failure is detected in a disk device 30b.

5 Claims, 9 Drawing Sheets

METHOD, APPARATUS, AND COMPUTER PRODUCT FOR MANAGING LOG DATA

BACKGROUND OF THE INVENTION

1. Field of the Invention

The present invention relates to a technology for managing log data of a computer.

2. Description of the Related Art

When a failure occurs in a computer system, log data showing a usage status of the system is typically used for analyzing the cause and recovering the system. The log data is stored, in an order the log data is acquired, into a system disk. When the system disk is filled to the edge with the log data, the log data is overwritten and deleted in an order starting with the oldest data.

For example, Japanese Patent Application Laid-Open No. 03-105434 discloses a technology for providing a storage area dedicated for storing log data related to a failure. When a failure occurs in a system, log data showing the usage status before the system failed is immediately saved in the storage area. When the storage area is full, the log data is overwritten and deleted in an order starting with the oldest data.

However, because old data is overwritten and deleted when the storage area is full, the log data related to the failure might not be properly saved.

Moreover, some types of log data are used for analyzing the cause of a failure, while others are used for recovering the system. For example, when a contradiction between a command and a processing is detected while the computer is operating, and the computer is rebooted for data protection, log data required for analyzing the cause of the failure might be acquired after the failure. Thus, if log data acquired before the system failed is immediately saved as in Japanese Patent Application Laid-Open No. 03-105434, the log data related to the cause of the failure might not be properly saved.

SUMMARY OF THE INVENTION

An apparatus according to an aspect of the present invention, which is an apparatus for storing log data of a computer to a storage unit including a first storage area and a second storage area, includes: a writing unit that writes the log data in the first storage area; and a control unit that controls, when a failure occurs in the computer, inhibits writing in the first storage area and controls the writing unit to write the log data following the failure in the second storage area.

A method according to another aspect of the present invention, which is a method of storing log data of a computer to a storage unit including a first storage area and a second storage area, includes: writing the log data in the first storage area; inhibiting, when a failure occurs in the computer, writing in the first storage area; and writing, when the failure occurs in the computer, the log data following the failure in the second storage area.

A computer-readable recording medium according to still another aspect of the present invention stores a computer program that causes a computer to execute the above method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
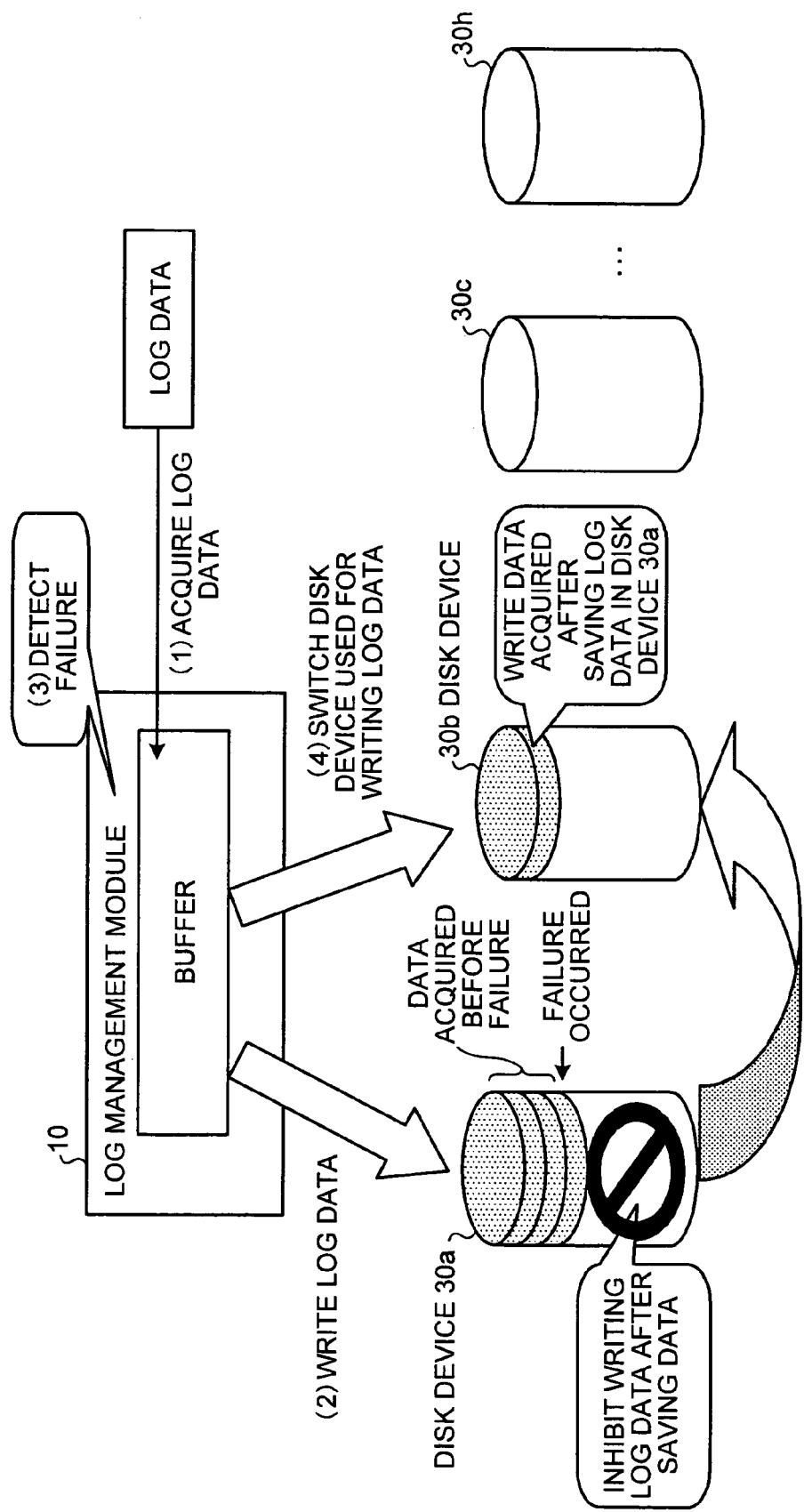
FIG. 1 is a diagram of a log management module according to a first embodiment of the present invention.

Exemplary embodiments of the present invention will be described below with reference to accompanying drawings. Common components are denoted by the same reference numerals and overlapping descriptions are omitted. The present invention is not limited to these embodiments.

FIG. 1 is a diagram of a log management module 10 according to a first embodiment of the present invention. The log management module 10 stores log data of a computer (not shown) in a first storage area, among a plurality of storage areas. When a failure occurs in the computer, the log management module 10 prohibits any more log data from being written the first storage area, and writes log data in a different storage area after the failure.

Specifically, under normal operation, the log management module 10 acquires log data from the computer, temporarily stores the log data in a buffer (see "(1)" in FIG. 1), and writes the stored log data in a disk device 30a (see "(2)" in FIG. 1). When the disk device 30a is filled to the edge with the log data, the log data in the disk device 30a is overwritten and deleted in an order starting with the oldest data. The log management module 10 repeats the process of writing newly acquired log data in the disk device 30a.

When the log management module 10 detects from the log data a failure in the computer (see "(3)" in FIG. 1), the log management module 10 prohibits any more log data from being written the disk device 30a. After the failure is detected, the log management module 10 writes log data in a disk device 30b instead of the disk device 30a (see "(4)" in FIG. 1).

Accordingly, the log data acquired before the failure is detected is saved in the disk device 30a for analyzing the cause of the failure. Moreover, when the failure is detected and log data is prohibited from being written in the disk device 30a, the log management module 10 can resume writing log data under normal operation by using the disk device 30b.

Figure 2:
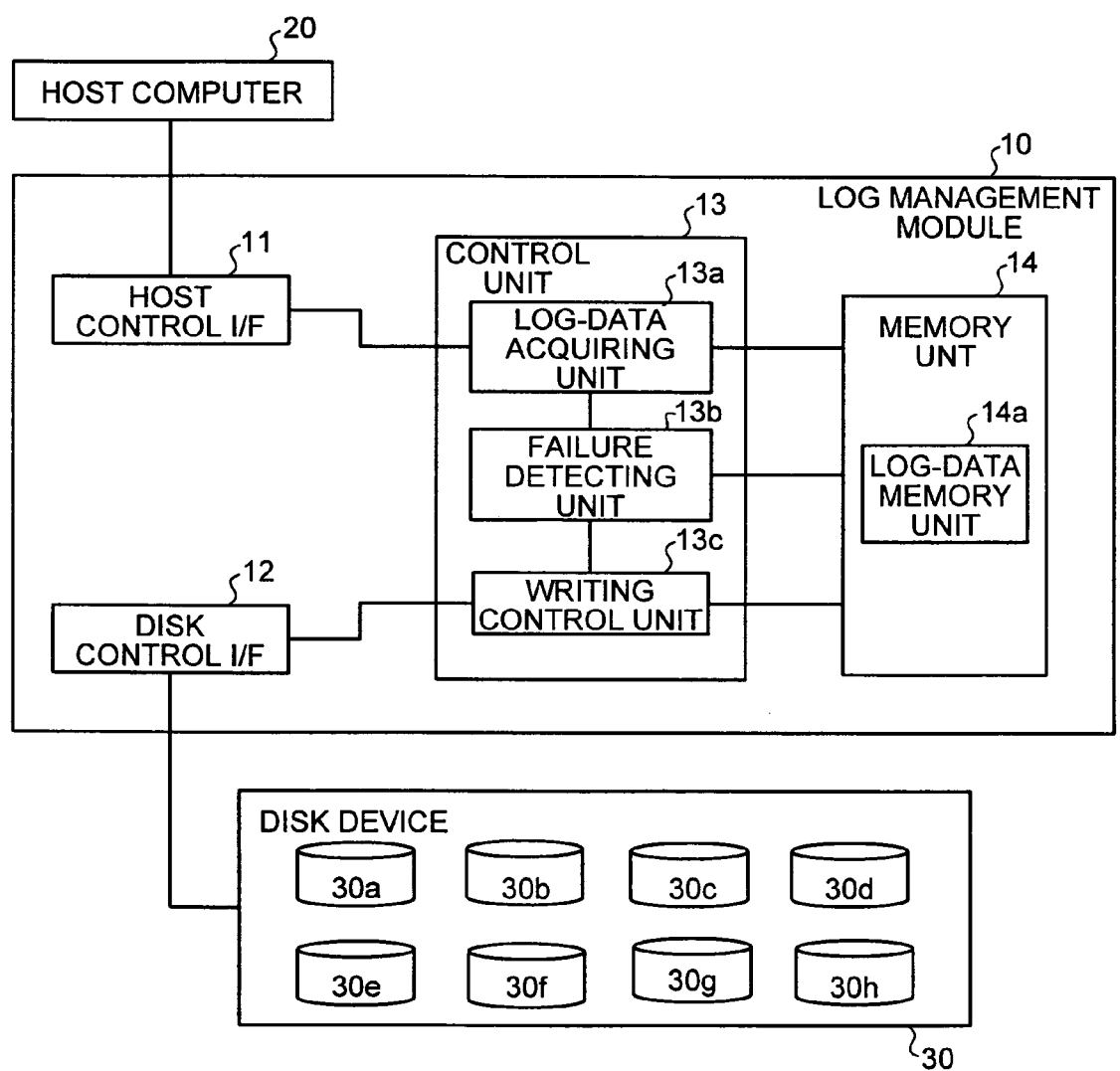
FIG. 2 is a block diagram of the log management module shown in FIG. 1.

FIG. 2 is a block diagram of the log management module 10. The log management module 10 is connected to a host computer 20 and a disk device 30 by buses etc. The disk device 30 is divided into a plurality of disk devices (disk devices 30a to 30h).

The log management module 10 includes a host control interface (I/F) 11, a disk control I/F 12, a control unit 13, and a memory unit 14. The host control I/F 11 controls transfer of log data between the log management module 10 and the host computer 20. The disk control I/F 12 controls communication between the log management module 10 and the disk device 30. Specifically, the disk control I/F 12 controls transfer of log data that is written in the disk device 30 by a writing control unit 13c.

The memory unit 14 stores data and programs required for various processings performed by the control unit 13. Particularly, the memory unit 14 includes a log-data memory unit 14a that is relevant to the present invention. The log-data memory unit 14a stores log data acquired by a log-data acquiring unit 13a.

The control unit 13 performs various processings and includes an internal memory that stores programs defining the processings and data required for the processings. Particularly, the control unit 13 includes the log-data acquiring unit 13a, a failure detecting unit 13b, and the writing control unit 13c that are relevant to the present invention.

The log-data acquiring unit 13a acquires, from the host computer 20, log data showing a usage status of the host computer 20, and temporarily stores the acquired log data in the log-data memory unit 14a. For example, the log data records that a component in the host computer 20 failed and was detached from the host computer 20.

The failure detecting unit 13b uses the log data acquired by the log-data acquiring unit 13a to detect a failure. Specifically, the failure detecting unit 13b monitors the log data temporarily stored in the log-data memory unit 14a for failures of the host computer 20. When a failure is detected, the failure detecting unit 13b notifies the failure to the writing control unit 13c.

The writing control unit 13c writes log data acquired by the log-data acquiring unit 13a into the disk device 30. When the failure detecting unit 13b detects a failure, the writing control unit 13c prohibits any more log data from being written the disk device 30 that stores log data acquired before the failure is detected. Then, the writing control unit 13c writes log data acquired after the failure is detected in a different disk device 30.

Specifically, under normal operation, the writing control unit 13c repeats the processing of writing log data stored in the log-data memory unit 14a into the disk device 30 when, for example, the log-data memory unit 14a is filled halfway, a predetermined time elapses, or the host computer 20 is turned off. When the writing control unit 13c receives a notification from the failure detecting unit 13b that a failure is detected, the writing control unit 13c stops writing log data in the disk device 30, saves the log data in the disk device 30, and writes log data in a different disk device 30. For example, if the disk device 30a stores the log data acquired before the failure is detected, the disk device 30b is used for writing in log data acquired after the failure is detected.

Figure 3:
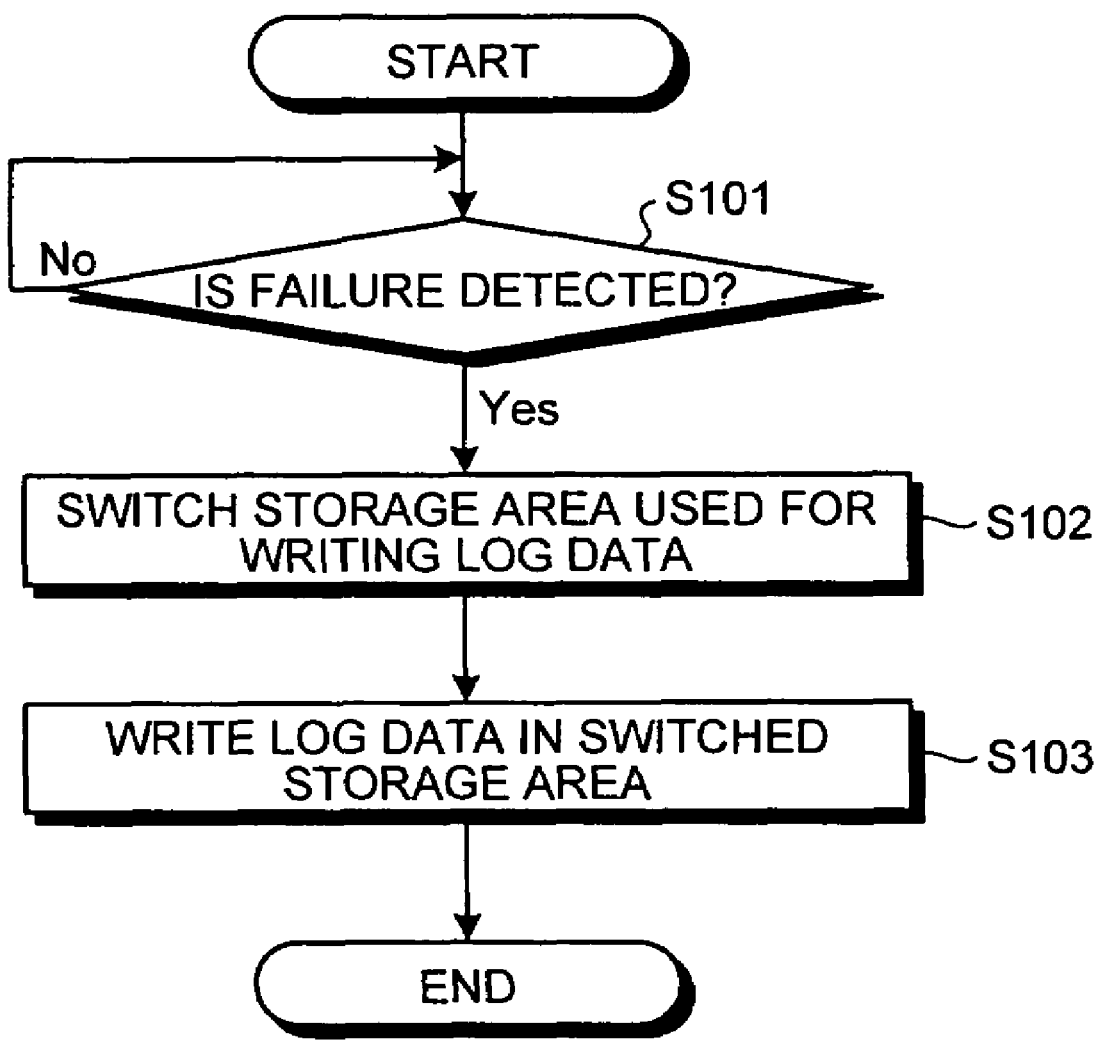
FIG. 3 is a flowchart of a processing procedure performed by the log management module shown in FIG. 1.

FIG. 3 is a flowchart of a processing procedure of managing log data according to the first embodiment. When the failure detecting unit 13b detects a failure in the host computer 20 (Yes at step S101), the failure detecting unit 13b notifies the writing control unit 13c that a failure is detected. When the notification is received at the writing control unit 13c, the disk device 30 used for writing in log data is switched to a different disk device 30 (step S102). The writing control unit 13c prohibits any more log data from being written in the disk device 30 storing log data acquired before the failure is detected. The writing control unit 13c resumes writing log data acquired after the failure is detected in the different disk device 30 (step S103).

According to the first embodiment, when a failure is detected in a computer, log data is prohibited from being written in a disk device storing log data acquired before the failure is detected. Log data acquired after the failure is detected is written in a different disk device. Thus, log data pertaining to the failure is saved properly.

According to the first embodiment, log data is prohibited from being written in a disk device immediately when a failure is detected, however, the present invention is not limited to this example. According to a second embodiment according to the present invention, log data is prohibited from being written in a disk device when a predetermined time passes after a failure is detected.

Figure 4:
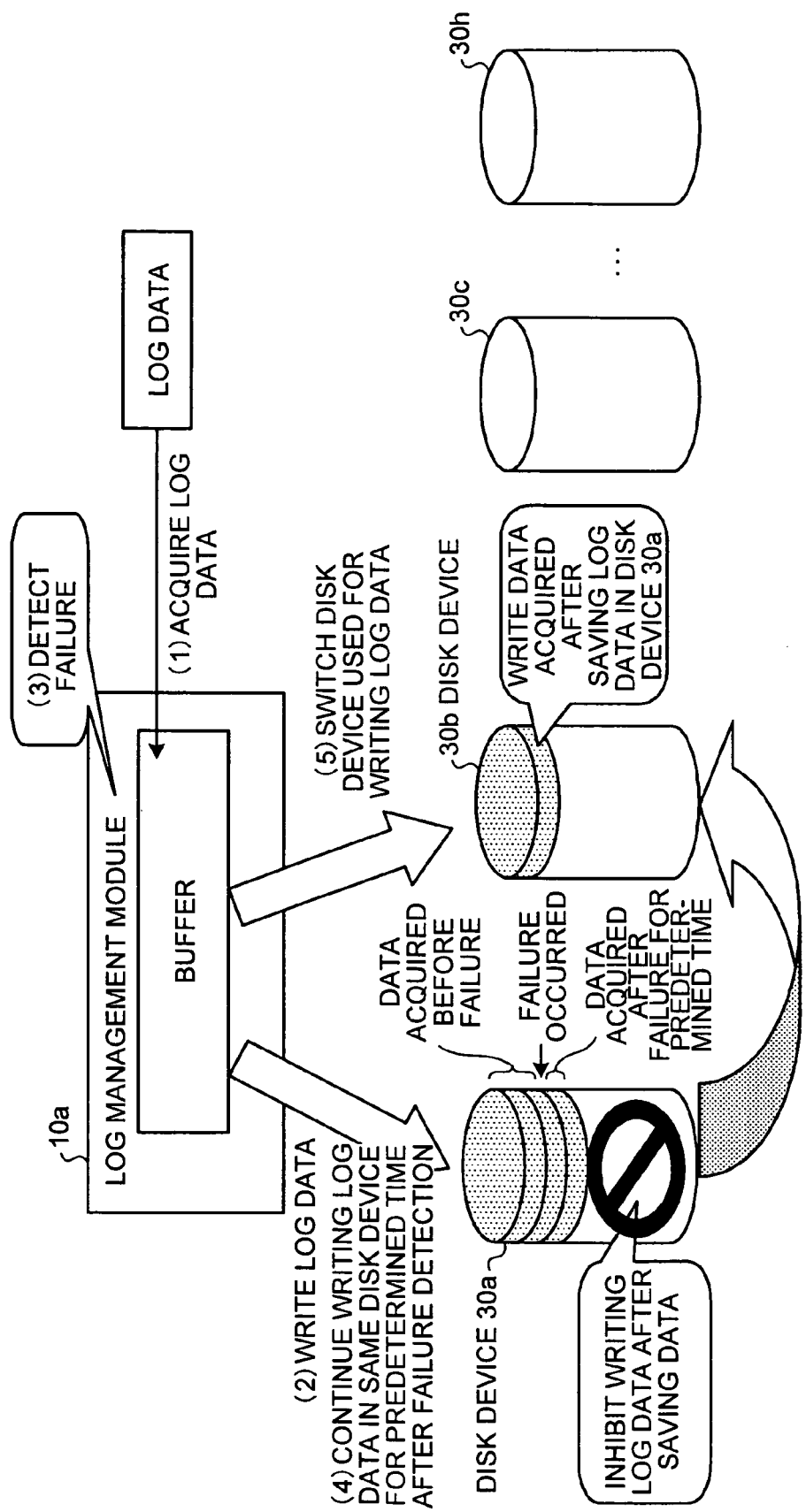
FIG. 4 is a diagram of a log management module according to a second embodiment of the present invention.

FIG. 4 is a diagram of a log management module 10a according to the second embodiment of the present invention. The main difference between the log management module 10 according to the first embodiment (FIG. 1) and the log management module 10a according to the second embodiment (FIG. 4) is that the log management module 10a continues writing log data in the same disk device 30a for a predetermined time after a failure in the host computer 20 is detected. After the predetermined time passes, the disk device 30a used for writing in log data is switched to the disk device 30b. Thus, the log management module 10a stores, in the same disk device 30a, log data acquired before the failure is detected and useful log data acquired within a predetermined time after the failure is detected.

For example, when the log management module 10a detects that a component in the host computer 20 failed and is detached from the host computer 20, instead of immediately saving the log data, the log management module 10a continues writing log data for a while. When a predetermined time passes after the failure is detected, the log management module 10a saves the log data. Thus, the log management module 10a can properly store useful log data acquired both before and after a failure.

Figure 5:
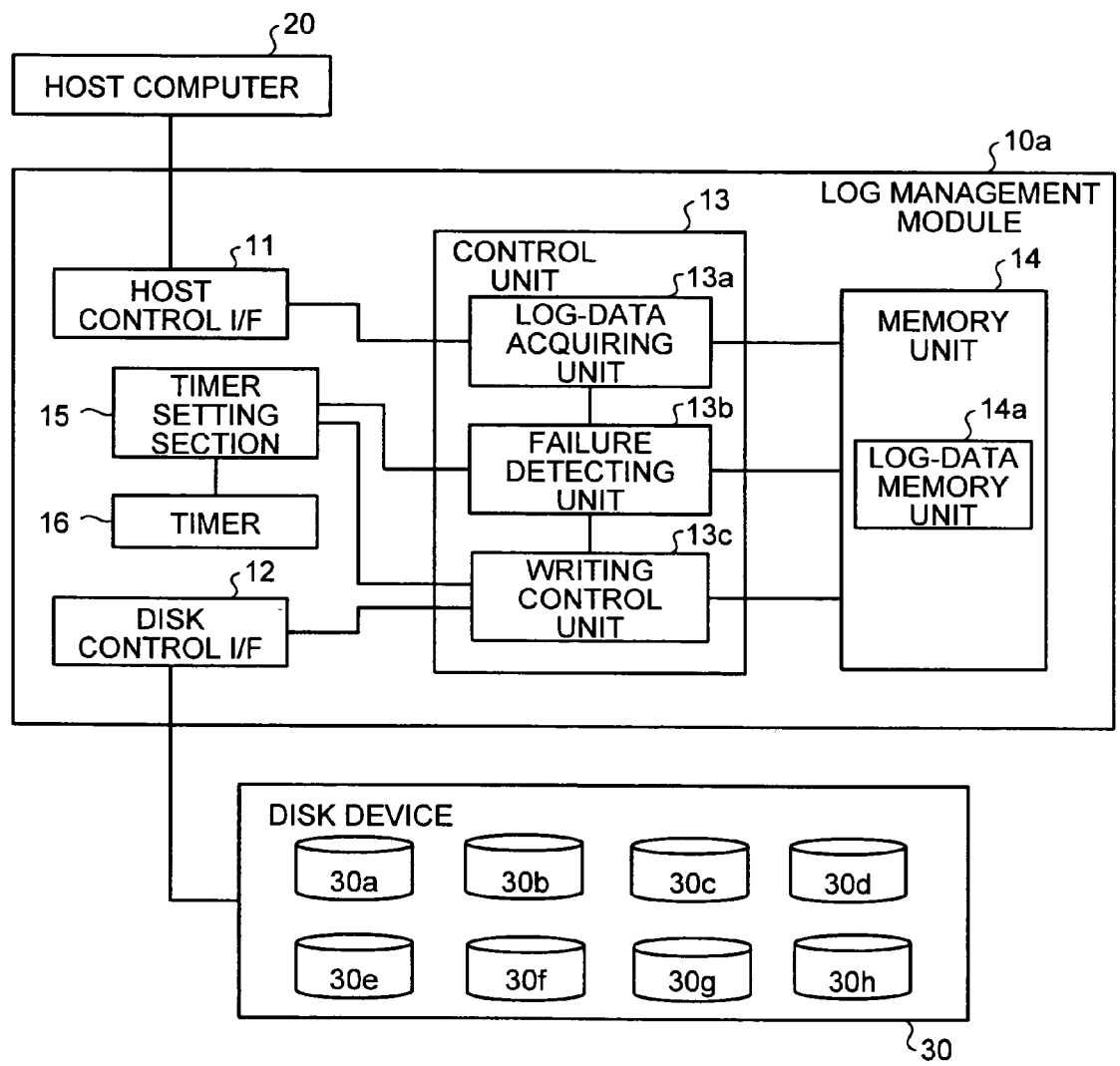
FIG. 5 is a block diagram of the log management module shown in FIG. 4.

FIG. 5 is a block diagram of the log management module 10a. The main difference between the log management module 10 (FIG. 2) and the log management module 10a (FIG. 5) is that the log management module 10a includes a timer setting unit 15 and a timer 16. The timer setting unit 15 sets the timer 16 according to the type of log data. Specifically, according to the type of log data from which a failure is detected, the timer setting unit 15 determines an appropriate time for writing useful log data after the failure is detected. The timer setting unit 15 then sets the determined time in the timer 16.

According to the second embodiment, the writing control unit 13c continues writing log data in the same disk device 30 until a time set in the timer 16 passes after a failure is detected. Then, the writing control unit 13c writes log data in a different disk device 30.

Figure 6:
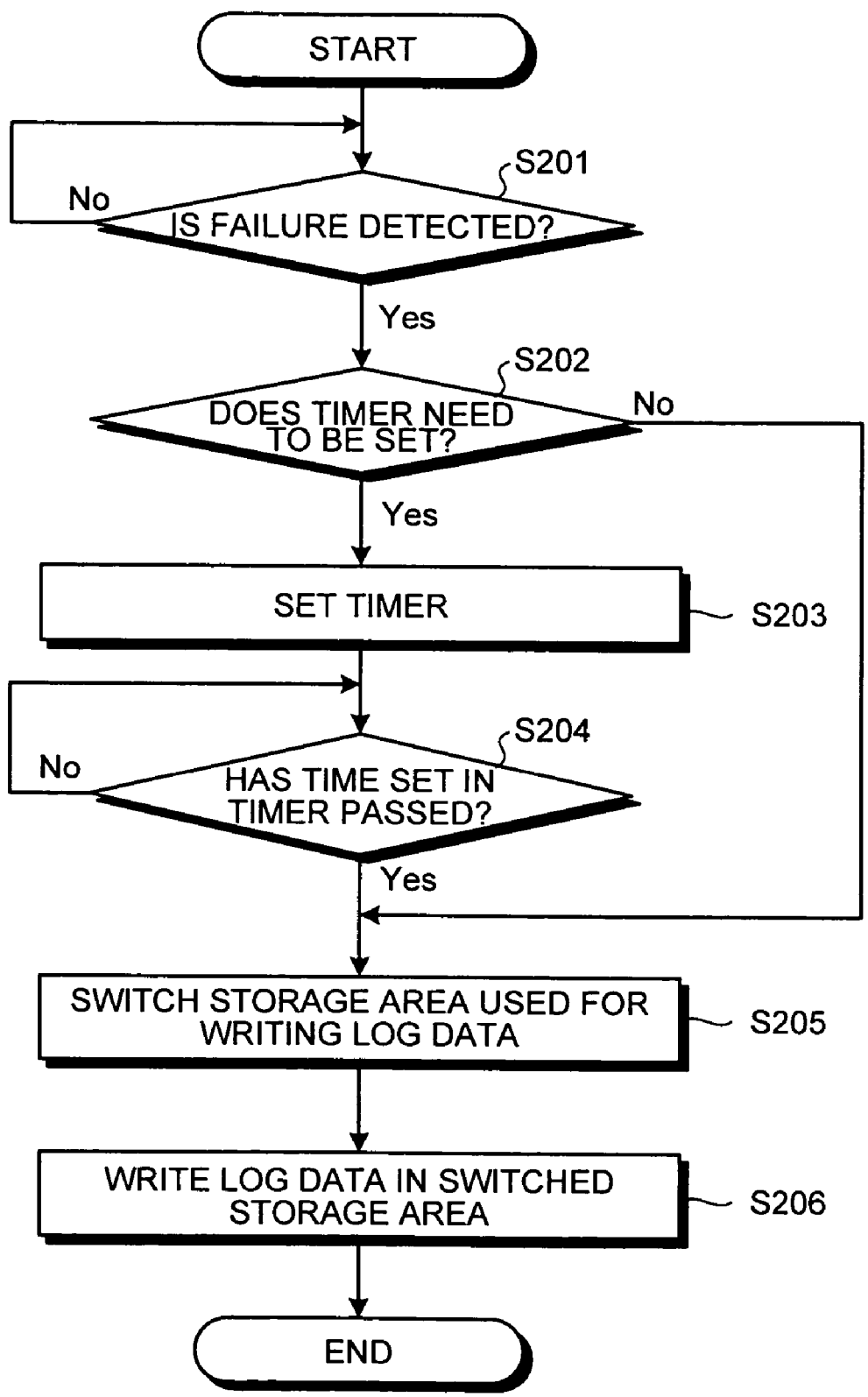
FIG. 6 is a flowchart of a processing procedure performed by the log management module shown in FIG. 4.

FIG. 6 is a flowchart of a processing procedure of managing log data according to the second embodiment. The main difference between the processing of the first embodiment (FIG. 3) and the processing of the second embodiment (FIG. 6) is that the second embodiment includes setting the timer 16, and the disk device 30 used for writing in log data is switched to a different disk device 30 when a predetermined time passes.

When the failure detecting unit 13b detects a failure (Yes at step S201), the timer setting unit 15 determines whether the timer needs to be set based on the type of log data (step S202).

When the timer does not need to be set (No at step S202), the disk device 30 used for writing in log data is switched to a different disk device 30 (step S205). The writing control unit 13*c* writes log data acquired after the failure is detected in the different disk device 30 (step S206).

On the other hand, when the timer needs to be set (Yes at step S202), the timer setting unit 15 sets an appropriate time in the timer according to the type of log data (step S203). The writing control unit 13*c* continues writing log data in the same disk device 30. When the time set in the timer passes, the disk device 30 used for writing in log data is switched to a different disk device 30 (step S205). The writing control unit 13*c* writes log data acquired after the time passes in the different disk device 30 (step S206).

According to the second embodiment, the disk device 30 used for writing in log data is switched to a different disk device 30 when a time set in a timer passes, so that useful log data acquired after the failure occurs is not overwritten. Thus, useful log data is saved properly.

Figure 7:
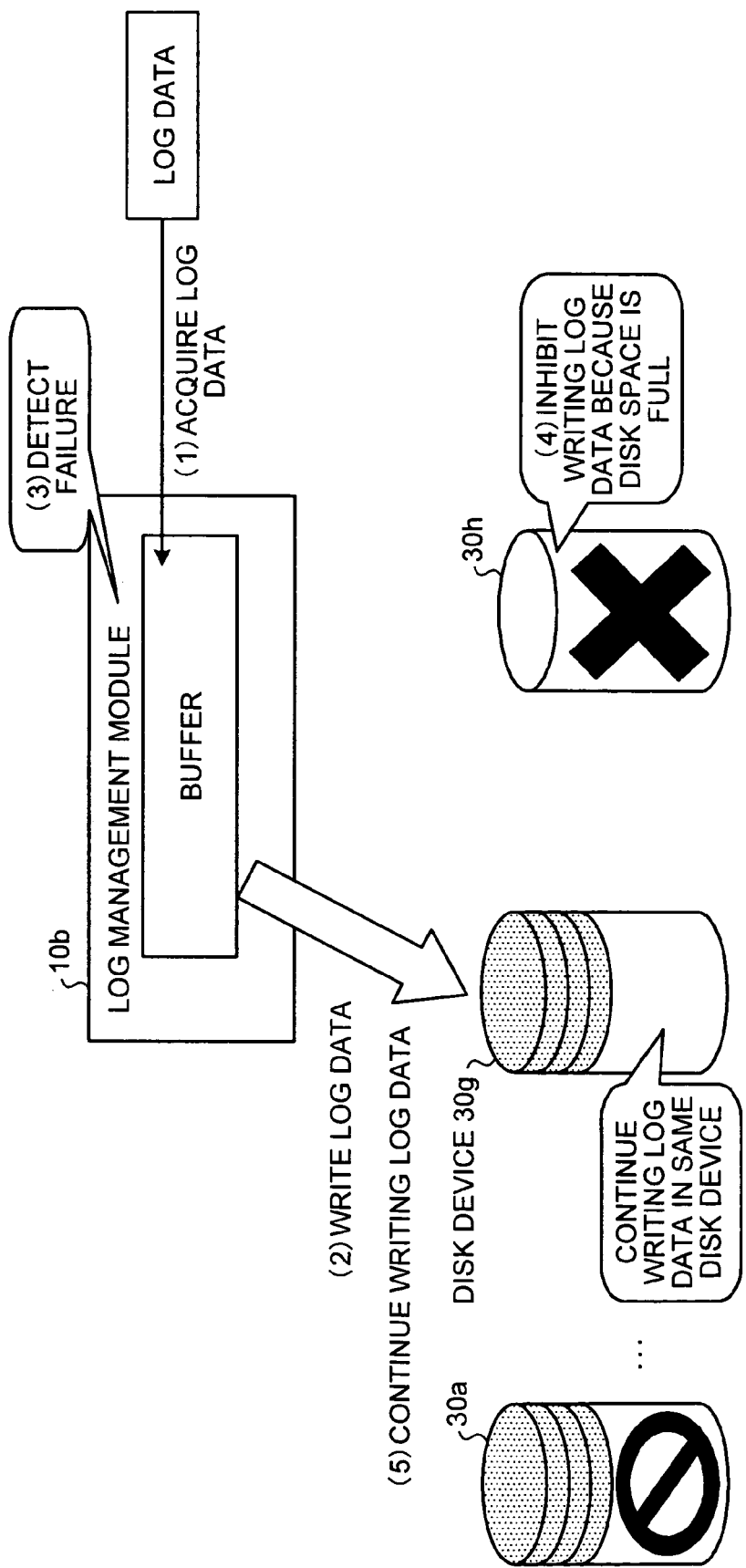
FIG. 7 is a diagram of a log management module according to a third embodiment of the present invention.

The present invention is not limited to the embodiments described above. In a third embodiment, various changes are described for each of the following components and features. FIG. 7 is a diagram of a log management module 10*b* according to the third embodiment of the present invention.

According to the first and second embodiments, the disk device 30 used for writing in log data is switched to a different disk device 30 when a failure is detected. However, as described in FIG. 7, when the different disk device 30*h* is full, the log management module 10*b* can continue writing log data in the same disk device 30*g* without switching disk devices. Thus, storage of log data acquired in real-time is prioritized.

According to the first and second embodiments, the log management module prohibits the saved log data from being overwritten. However, the saved log data can also be prohibited from being deleted. Specifically, even when a user instructs to delete the saved log data, the log management module rejects the instruction. Thus, the saved log data is prevented from being deleted accidentally. For example, when a user is recovering a computer system after a failure, log data acquired before the failure is detected is prevented from being deleted by mistake.

Figure 8:
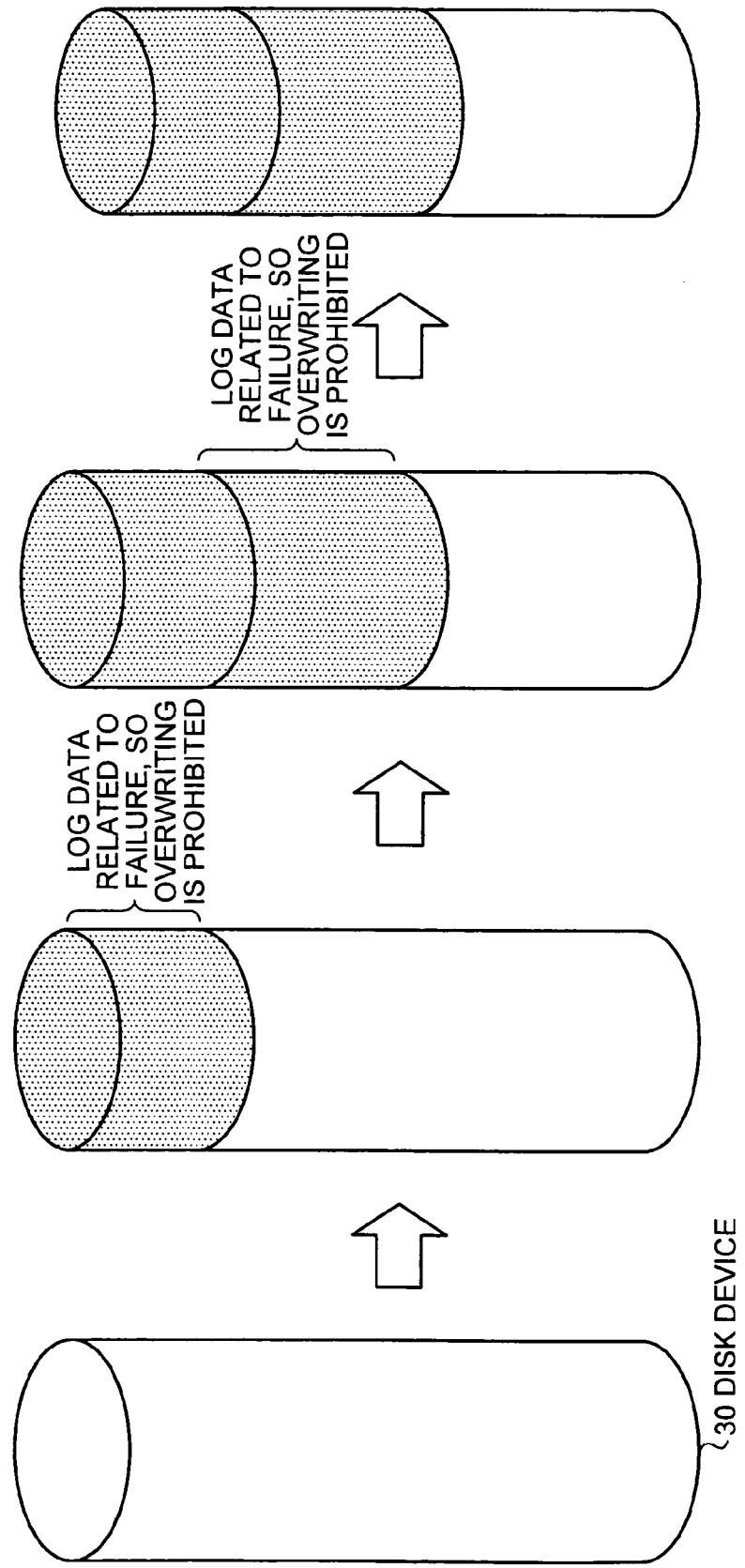
FIG. 8 is a diagram for describing writing of log data in a disk device performed by the log management module shown in FIG. 7.

According to the first and second embodiments, the disk device 30 is divided into a plurality of disk devices 30*a* to 30*h*. However, as shown in FIG. 8, each time the log management module saves log data that cannot be overwritten, the disk device 30 can be divided according to the disk space used by the saved log data. Log data acquired subsequently is written in the remaining disk space. Thus, the disk device 30 can be used efficiently without wasting disk space, so that the disk device 30 can store as much log data as possible.

According to the first and second embodiments, the log management module manages log data and detects a failure in a computer. However, a device monitoring module can be provided in addition to the log management module. The device monitoring module detects a failure in the computer, and notifies the detected failure to the log management module.

The constituent elements of the log management modules illustrated in FIGS. 2 and 5 are merely conceptual and may not necessarily physically resemble the structures shown in the drawings. For instance, the modules need not necessarily have the structure that is illustrated. The modules as a whole or in parts can be broken down or integrated either functionally or physically in accordance with the load or how the device is to be used. For example, the log-data acquiring unit 13*a* and the failure detecting unit 13*b* shown in FIG. 2 can be integrated. The process functions performed by the devices are entirely or partially realized by a CPU or a program executed by the CPU or by a hardware using wired logic.

All the automatic processes explained in the present embodiments can be, entirely or in part, carried out manually. Similarly, all the manual processes explained in the embodiments can be entirely or in part carried out automatically by a known method. The sequence of processes, the sequence of controls, specific names, and data including various parameters can be changed as required unless otherwise specified.

Figure 9:
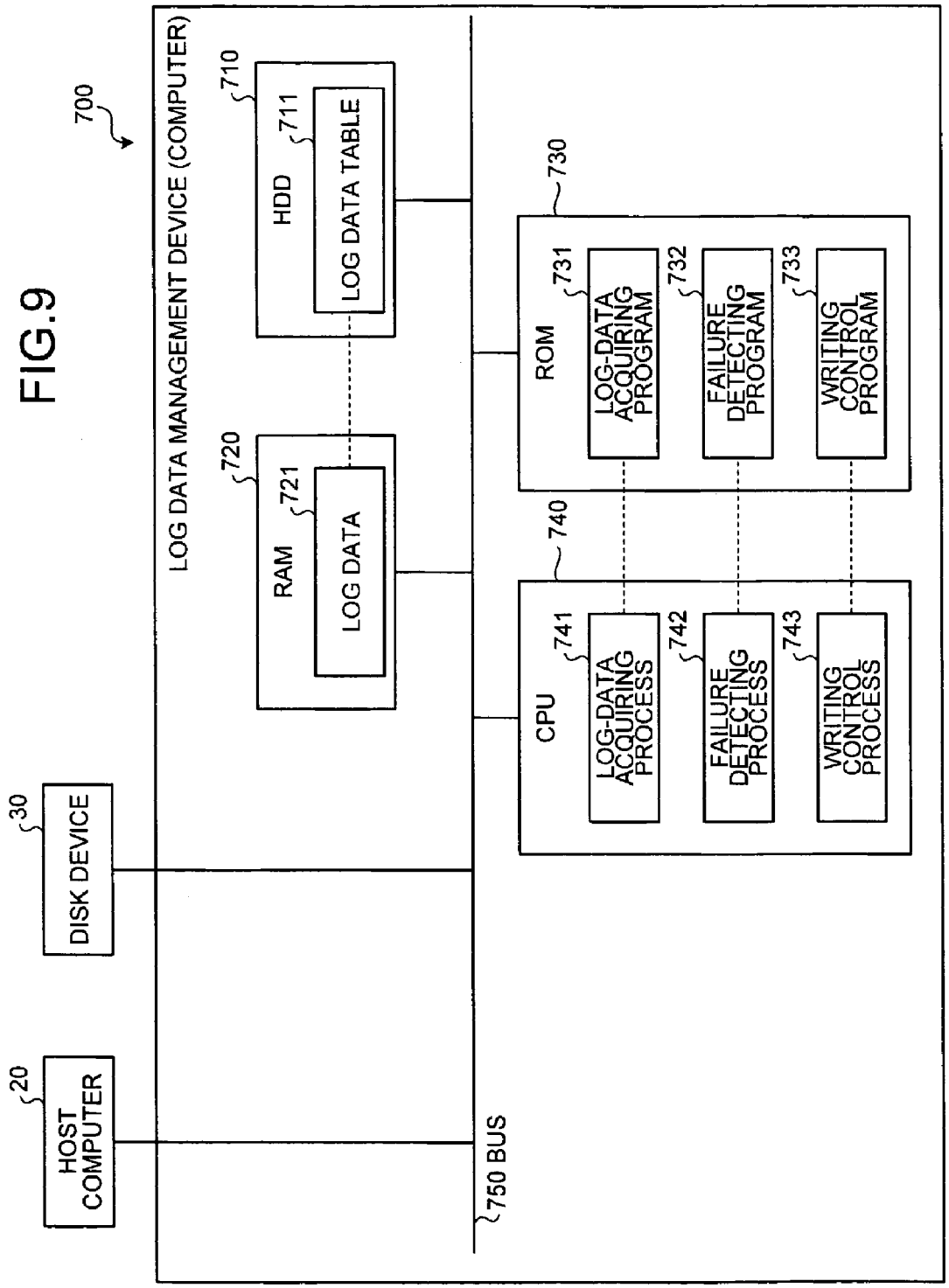
FIG. 9 is a diagram of a computer for executing a log data management program.

The processings according to the above embodiments of the present invention can be implemented on a computer program by executing a computer program. FIG. 9 is a computer 700 that executes a log data management program according to the present invention.

The computer 700 functions as a log data management device, and is connected to the host computer 20 and the disk device 30. The computer 700 includes a hard disk drive (HDD) 710, a random access memory (RAM) 720, a read only memory (ROM) 730, a central processing unit (CPU) 740, and a bus 750 that connects these components.

The ROM 730 stores the log-data management program that functions as the embodiment. Specifically, the ROM 730 stores a log-data acquiring program 731, a failure detecting program 732, and a writing control program 733. The programs 731 to 733 can be broken down or integrated.

The CPU 740 reads the programs 731 to 733 from the ROM 730 and executes the programs. Accordingly, the programs 731 to 733 function as a log-data acquiring process 741, a failure detecting process 742, and a writing control process 743. The processes 741 to 743 correspond to the log-data acquiring unit 13*a*, the failure detecting unit 13*b*, and the writing control unit 13*c* shown in FIG. 2, respectively.

The HDD 710 includes a log data table 711 that corresponds to the log-data memory unit 14*a* shown in FIG. 2. The CPU 740 registers log data in the log data table 711, reads the log data from the log data table 711, and stores the log data in the RAM 720 as log data 721. Then, the CPU 740 executes a processing to manage log data based on the log data 721 stored in the RAM 720.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for storing log data of a computer to a storage unit including a first storage area and a second storage area, the apparatus comprising:
   a writing unit that writes the log data in the first storage area; and
   a control unit that detects a failure in the computer from the log data, and when the failure in the computer is detected, inhibits writing the log data in the first storage area and switches to the second storage area prohibiting any more log data following the failure from being written in rest of areas in the first storage area, to prevent the log data in the first storage area acquired before the failure from being overwritten, and controls the writing unit to write the log data following the failure in the second storage area after switching.

2. The apparatus according to claim 1, wherein
   the control unit inhibits writing in the first storage area in a predetermined time after the failure, and the predetermined time is determined based on a type of the failure.

3. The apparatus according to claim 1, wherein the control unit further inhibits deleting the log data from the first storage area.

4. A method of storing log data of a computer to a storage unit including a first storage area and a second storage area, the method comprising:
- detecting a failure in the computer from the log data;
- writing the log data in the first storage area;
- inhibiting, when the failure in the computer is detected, writing in the first storage area, switching to the second storage area and prohibiting any more log data following the failure from being written in rest of areas in the first storage area, to prevent the log data in the first storage area acquired before the failure from being overwritten; and
- writing, when the failure in the computer is detected, the log data following the failure in the second storage area after switching.

5. A computer-readable recording medium that stores a computer program for storing log data of a computer to a storage unit including a first storage area and a second storage area, wherein the computer program causes the computer to execute:
- detecting a failure in the computer from the log data;
- writing the log data in the first storage area;
- inhibiting, when the failure in the computer is detected, writing the log data in the first storage area, switching to the second storage area and prohibiting any more log data following the failure from being written in rest of areas in the first storage area, to prevent the log data in the first storage area acquired before the failure from being overwritten; and
- writing, when the failure in the computer is detected, the log data following the failure in the second storage area after switching.

* * * * *